US 6,586,810 B2

(12) United States Patent
Thakur

(10) Patent No.: US 6,586,810 B2
(45) Date of Patent: Jul. 1, 2003

(54) SENSOR APPARATUS USING AN ELECTROCHEMICAL CELL

(76) Inventor: Mrinal Thakur, 1309 Gatewood Dr., Apt. 1703, Auburn, AL (US) 36830

( * ) Notice: Subject to any disclaimer, the term of this patent is extended or adjusted under 35 U.S.C. 154(b) by 0 days.

(21) Appl. No.: 10/217,810

(22) Filed: Aug. 12, 2002

(65) Prior Publication Data

US 2003/0034534 A1 Feb. 20, 2003

Related U.S. Application Data

(63) Continuation-in-part of application No. 09/586,209, filed on Jun. 2, 2000, now Pat. No. 6,448,621
(60) Provisional application No. 60/137,763, filed on Jun. 4, 1999.

(51) Int. Cl.7 .............................................. H01L 29/82
(52) U.S. Cl. ........................ 257/417; 257/414; 257/415
(58) Field of Search ................................ 257/417, 414, 257/415

(56) References Cited

U.S. PATENT DOCUMENTS

| 5,885,468 A | 3/1999 | Kozlowski ...................... 216/2 |
| 6,156,449 A | 12/2000 | Zuber et al. ................... 429/42 |
| 6,159,352 A | 12/2000 | Riera et al. ................. 204/530 |
| 6,160,278 A | 12/2000 | Liu et al. ..................... 257/252 |
| 6,241,873 B1 * | 6/2001 | Namba et al. ............... 205/784 |
| 6,245,847 B1 | 6/2001 | Green et al. ................. 524/418 |

FOREIGN PATENT DOCUMENTS

| JP | 6-151997 | 5/1994 |

* cited by examiner

Primary Examiner—David Nelms
Assistant Examiner—Tu-Tu Ho
(74) Attorney, Agent, or Firm—Thomas, Kayden, Horstemeyer & Risley, LLP

(57) ABSTRACT

A method for sensing mechanical quantities such as force, stress, strain, pressure and acceleration is disclosed. This technology is based on a change in the electrochemically generated voltage (electromotive force) with application of force, stress, strain, pressure or acceleration. The change in the voltage is due to a change in the internal resistance of the electrochemical cell with a change in the relative position or orientation of the electrodes (anode and cathode) in the cell. The signal to be detected (e.g. force, stress, strain, pressure or acceleration) is applied to one of the electrodes to cause a change in the relative position or orientation between the electrodes. Various materials, solid, semisolid, gel, paste or liquid can be utilized as the electrolyte. The electrolyte must be an ion conductor. The examples of solid electrolytes include specific polymer conductors, polymer composites, ion conducting glasses and ceramics. The electrodes are made of conductors such as metals with dissimilar electro negativities. Significantly enhanced sensitivities, up to three orders of magnitude higher than that of comparable commercial sensors, are obtained. The materials are substantially less expensive than commercially used materials for mechanical sensors. An apparatus for sensing such mechanical quantities using materials such as doped 1,4 cis-polyisoprene and nafion. The 1,4 cis-polyisoprene may be doped with lithium perchlorate or iodine. The output voltage signal increases with an increase of the sensing area for a given stress. The device can be used as an intruder alarm, among other applications.

13 Claims, 3 Drawing Sheets

SENSOR APPARATUS USING AN ELECTROCHEMICAL CELL

CROSS-REFERENCE TO RELATED APPLICATIONS

The present application claims the benefit of co-pending U.S. Provisional Patent Application Ser. No. 60/137,763 filed Jun. 4, 1999, which is incorporated by reference in its entirety herein. This application is a continuation-in-part of application Ser. No. 09/586,209, entitled "Sensor Apparatus Using an Electrochemical Cell" filed on Jun. 2, 2000 now U.S. Pat. No. 6,448,621 which is incorporated by reference in its entirety herein.

STATEMENT OF GOVERNMENT SUPPORT

This invention was made with government support under DE-FC02-91-ER75678, Amendment No. A006 awarded by Department of Energy through the Alabama DOE/EPSCoR Program.

FIELD OF THE INVENTION

The present invention relates to sensor technology. More particularly, the present invention relates to mechanisms for sensing such quantities and qualities as stress, strain, force, pressure and acceleration based on a change in electrochemically generated voltage with application of stress, strain, force, pressure or acceleration.

BACKGROUND OF THE INVENTION

Sensors play a vital role in today's technology. There is a great demand for sensors of stress, strain, force, pressure and acceleration. The mechanisms and methods that are usually used for sensing these qualities (and quantities thereof) include: piezoelectric, piezoresistive, capacitive and fiber-optic. These technologies have their advantages and disadvantages. The piezoelectric sensors rely on a generation of charges or a voltage when a stress or strain is applied. The piezoresistive sensors are based on a change in resistivity in a semiconductor with an applied stress or strain. The capacitive sensor relies on a change in capacitance as a stress or strain is applied on one of the electrodes of the capacitor thereby changing the separation of the electrodes. The fiber-optic sensors sense a change in light transmission through optical fiber when a stress or strain is applied. The best piezoelectric material is a solid solution of $PbZrO_3$ and $PbTiO_3$ (PZT) which is a ceramic material. PZT is not suitable for providing a sensor for a large area. It suffers another disadvantage in that PZT is a ceramic which is very brittle and subject to breaking. Piezoelectricity is a transient effect and produces little change if a constant stress or strain is applied. The ceramic material is brittle and relatively expensive. The polymer polyvinylidene fluoride (PVDF) is also a piezoelectric material but has a much smaller piezoelectric coefficient than PZT and both the ceramic and polymer materials need to be poled at a high voltage and high temperature to obtain the piezoelectric behavior, which increases the cost. Hence any large area (>1 $cm^2$) application is expensive. The best piezoresistive material is silicon which is relatively expensive and brittle and the piezoresistivity is temperature sensitive. The capacitive sensors have high sensitivity but a smaller range of operation providing linearity. The fiber-optic sensors can be too sensitive to temperature fluctuation. In any case, the world market in sensors is expanding at a rapid pace and has already exceeded ten billion U.S. dollars. Novel sensor technologies providing highly sensitive, inexpensive and more versatile sensors than presently available can make an immediate impact in this market.

DESCRIPTION OF THE PREFERRED EMBODIMENTS

Figure 1:
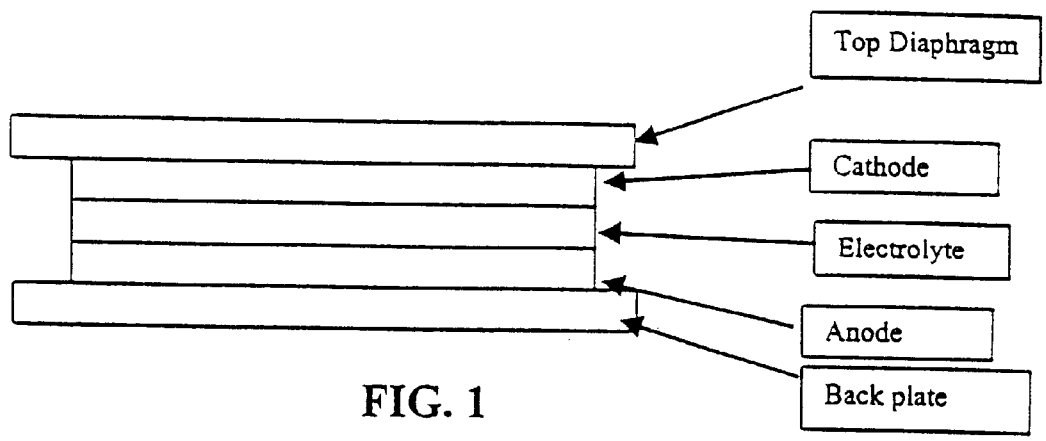
FIG. 1 is a schematic of the device structure of a sensor involving a solid electrolyte.

The present invention involves an entirely different mechanism for sensing such qualities (and quantities thereof) as stress, strain, force, pressure and acceleration than the mechanisms discussed above. The sensing in this novel technology is based on a change in electrochemically generated voltage with application of stress, strain, force, pressure or acceleration. The change in the electromotive force or voltage of the electrochemical cell results from a change in the internal resistance which is caused by a change in the relative position or orientation between the electrodes. The generic device configuration is discussed below.

The device essentially involves a standard electrochemical cell including an anode, a cathode and an electrolyte between the electrodes. The electrodes are made of metals or conductors of dissimilar electronegativities. The electrolyte is an ion conductor in the solid, semisolid, gel, paste or liquid state. The overall designs or geometries of the device can be varied. For example, one of the electrodes can be mounted on a thin material (plastic, metal or other material) and tough diaphragm which receives and transfers the applied stress, strain, force, pressure or acceleration to the electrolyte. As the diaphragm, for example, depresses the electrolyte, the separation between the electrodes decreases and thereby a change in internal resistance is caused and that leads to a change in the electromotive force (voltage) of the cell. This change in the voltage is directly recorded or displayed using an oscilloscope for different magnitudes of stress, strain, force, pressure or acceleration. Thus the overall construction and operation of such a sensor is very simple and straightforward. The device does not need any external power source (voltage or current) to operate. The sensor responds to both static and dynamic loading (note: piezoelectric sensors do not respond to a static loading). Very high sensitivity can be achieved even without using an amplifier. Thus, these are clear advantages over the existing technologies of sensing involved in piezoresistive, piezoelectric, capacitive and fiber-optic sensing systems. In addition, the examples of sensors discussed in the present invention involve polymer electrolytes which are very inexpensive and easy to process as large area thin films. Polymers such as polyethylene oxide, polypropylene oxide, and 1,4 cis-polyisoprene doped with lithium perchlorate or iodine are some of the examples discussed in this patent application. However, this invention is in no way limited to polymer electrolytes. Other electrolytes including specific inorganic solids, pastes, gels and liquids that can be configured to receive and react to the stress, strain, force, pressure and acceleration signals reversibly and reproducibly are also covered within this invention. The devices based on this technology are expected to be significantly less expensive than relevant commercial devices.

The invention will be further described in connection with the following examples, which are set forth for purposes of illustration only. Parts and percentages appearing in such examples are by weight unless otherwise stipulated.

EXAMPLES OF DEVICE CONFIGURATIONS

Example 1

The electrolyte under consideration (e.g. polyethlene oxide doped with lithium perchlorate) is spread as a uniform film on a thin sheet of metal (e.g. aluminum foil). Alternatively, a thin film of the electrolyte (e.g. nafion, commercially available) is placed on a thin sheet of metal. Then another metal electrode with a dissimilar electronegativity (e.g. gold) is evaporated on top of the electrolyte. Alternatively a copper tape can be overlaid on the electrolyte film. Thus an electrochemical cell is constructed including the anode and cathode facing each other with the electrolyte in between. The whole assembly can now be transferred to a plastic or metal housing with a thin plastic sheet acting as the receptor and transmitter of the external stimuli (force, stress, strain, pressure and acceleration). The top plastic or metal cover is in intimate contact with the top electrode. This is the basic configuration (FIG. 1).

Example 2

The electrolyte is uniformly dispersed in a solid matrix (e.g. crosslinked natural rubber, paper), and a thin film of that composite is placed in intimate contact with a thin sheet of a metal (e.g. aluminum foil). The matrix containing the electrolyte is covered with another metal of a dissimilar electronegativity (e.g. copper) (FIG. 1).

Example 3

Figure 2:
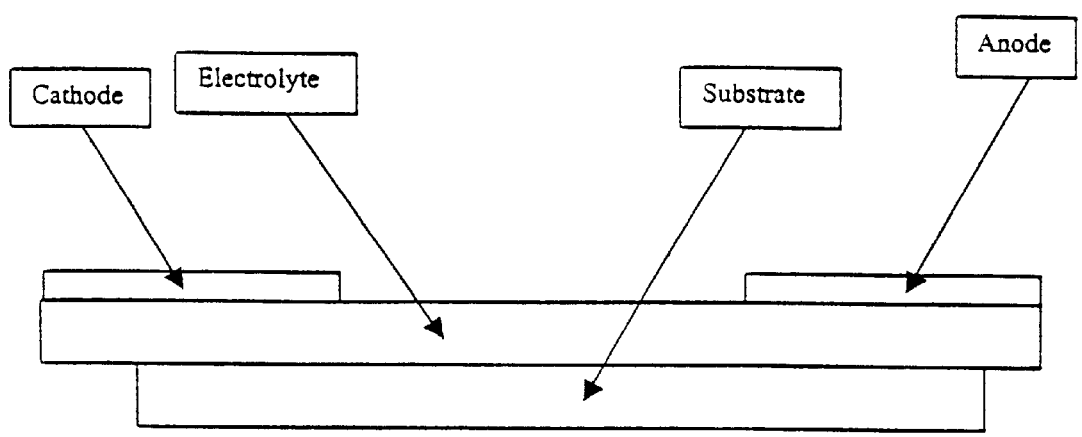
FIG. 2 is a schematic of a sensor with electrodes deposited in a side-by-side structure.

Alternatively, the electrolyte can be coated on the surface (e.g. silicon chip) that needs to be monitored for stress or strain distribution. A metal electrode (e.g. aluminum foil) is applied and then another metal electrode with a dissimilar electronegativity (e.g. a copper tape) is applied side-by-side on the substrate. Then the electrolyte film coated covering the two electrodes to form an electrochemical cell (FIG. 2).

Example 4

An electrochemical cell consisting of a liquid electrolyte and two metal electrodes of dissimilar electronegativities is constructed. One of the electrodes (triangular shape with the tip touching the liquid) is movable up and down into the electrolyte so that its contact surface area with the electrolyte can be varied. As that electrode is inserted inside the electrolyte resulting in a larger area of contact, the internal resistance is reduced and thus causing an increase in the voltage output. This movable electrode can be connected to a spring or any other restoring mechanism so that the electrode returns to its original position as the applied stress or force is removed.

Example 5

A thin sheet of nafion (perfluorosulfonate based electroyte) (1 ft.×1 ft) was purchased from Aldrich Chemicals Corp. A 15 cm×15 cm section was cut from this sample. This section was placed between two thin metal foils—copper on one side and aluminum on the other. The assembly was covered with a plastic film and packaging tape with two electrical leads connected to the metal foils. The nation was in contact with the metal foils. The voltage output without any stress was about 11 mV as measured on an oscilloscope. As a small amount of pressure was applied on one of the metal foils using a finger, a voltage as large as 250 mV was produced. When the pressure was released, the output again showed 11 mV. This device acts like a switch. With an appropriate amplifier, the signal can be increased to a large enough value to produce acoustic (audible) or light (e,g for driving an LED) signals. Thus, this device can be used for detection (e.g. intruder alarms) in security systems.

Example 6

A thin sheet of 1,4 cis-polyisoprene (5 cm×5 cm) was prepared from a latex sample received from Firestone Inc. The film was doped with iodine for 24 hours. The doped sample was placed between two thin metal foils—copper on one side and aluminum on the other. The assembly was covered with a plastic film and packaging tape with two electrical leads connected to the metal foils. The doped film was in contact with the metal foils. The voltage output without any stress was about 8 mV as measured on an oscilloscope. As a small amount of pressure was applied on one of the metal foils using a finger, a voltage as large as 150 mV was produced. When the pressure was released, the output again showed 8 mV. This device acts like a switch. With an appropriate amplifier, the signal can be increased to a large enough value to produce acoustic (audible) or light (LED) signals. Thus this device can be used for detection (e.g. intruder alarms) in security systems.

The devices prepared and tested in Examples 5 and 6 can be used for detection in security devices, such as intruder alarms. These devices can be used to discriminate between smaller and larger stresses, such as the weight of the intruder. These devices could be used to discriminate between a small intruder, such as a cat, and the human being. A larger device could be used to discriminate between different automobiles based upon their weight.

The above exemplary device structures, 1) and 2), can be replicated and stacked in series to give even higher sensitivity than an individual device. The emphasis of the present invention is on the basic concept involving a modified configuration of an electrochemical cell to use it as a highly sensitive sensor and the scope of this invention is by no means limited to the examples of the device designs discussed above.

Electrical connection is made to the anode and cathode using a coaxial cable and the cell voltage is monitored using an oscilloscope. For calibration purposes, a shaker is used to apply a known magnitude of force on the top electrode (configuration (i)) and the change in the electromotive force in the cell is recorded in the oscilloscope. Due to the 20 small thickness of the film, side-by-side as opposed to face-to-face configuration of the electrodes and the distance between the electrodes in device configuration 3), the internal resistance is high. Then a charge amplifier is used similar to piezoelectric sensors to display the output of the device in the oscilloscope.

A large-area of such sensors can be produced since the materials involved (e.g. polymers and metal films) are easily processible and inexpensive. Such sensors can be applied under the rugs, or in other areas of homes, offices, vehicles and other important locations. A mechanical stress applied on such a sensor (e.g. by the presence of an intruder) will cause a sufficient voltage output which after processing can produce audible, visible or any other type of signals for detection in security systems. Other applications of such large-area sensors include automotive detection in traffic on roads and highways.

Materials

A broad range of materials can be useful in this novel technology. Examples of materials used to demonstrate this technology include: polymer electrolytes such as polyethylene oxide doped with lithium perchlorate, polypropylene oxide doped with lithium perchlorate, nafion (perfluorosulfonate based electrolytes), semiconducting polymers such as doped polyaniline, and 1,4 cis-polyisoprene in the latex or crosslinked form doped with lithium perchlorate, iodine or other materials. Many other similar ion conducting doped polymers will be operative in this technology. No poling of the polymers is necessary for these devices—therefore the cost should be substantially lower compared to PVDF in manufacturing. It should be pointed out that the above polymers are conductive so that the devices constructed from them would have lower impedance compared to the piezoelectric devices.

In principle, any electrolyte (paste, gel, liquid, semi-solid, solid) used in commercial batteries, in appropriate device configuration, can be used in this application. Composites of polymer electrolytes in a flexible polymer matrix (e.g. crosslinked natural rubber) are excellent choices. In addition, ion conducting ceramics and glasses in the form of composite in a polymer matrix can also be used as electrolytes in these devices. Various metallic and nonmetallic electrodes of different electronegativities can be used for fabrication of these sensors. The choice of metals and the ion mobility in the electrolyte are important to maximize the sensitivity. Similar to batteries, the wider the difference in electronegativities of the metals the larger is the output voltage. Just as in the case of batteries, the devices need to be hermetically sealed to obtain the longest lifetime for use in sensing.

Sensitivity

Figure 3:
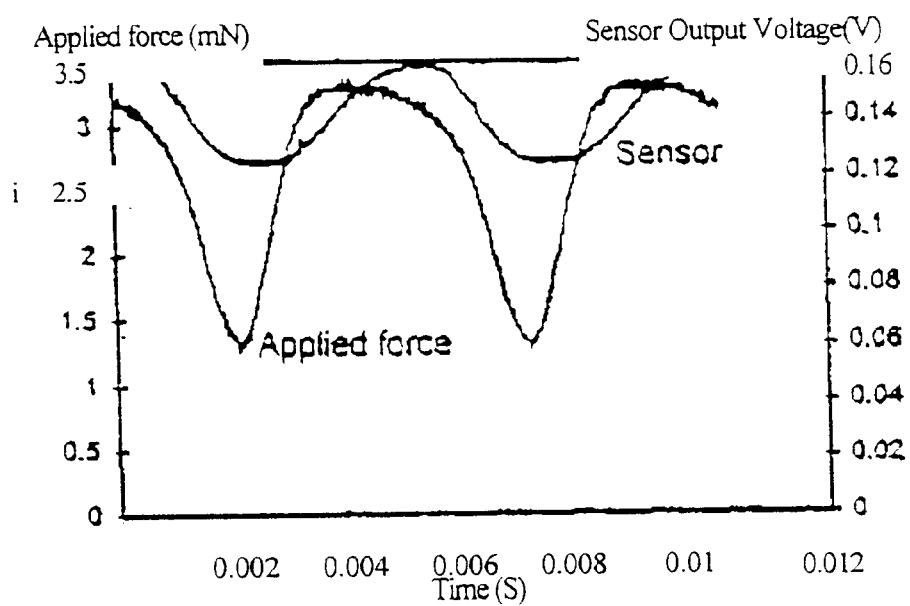
FIG. 3 is a graph of the sensor output characteristics for different magnitudes of applied forces. The configuration of this sensor is as given in FIG. 1. The output voltages were recorded on an oscilloscope and no amplifier was required. A maximum change in voltage of about 15 mV was observed for a force of about 0.8.

As stated earlier, the sensors in the technology discussed in this patent are highly sensitive. An output (change in voltage) as large as 15 mV for a force of 0.8 millinewton ($0.8 \times 10^{-3}$N) has been achieved in polyethylene oxide lithium perchlorate based sensors without using any amplifier. The measured sensor output as a function of force for such a device is attached (FIG. 3). The device configuration (1 and 2) for this measurement involved a parallel arrangement (FIG. 1) of the anode, cathode and the electrolyte film (polyethylene oxide+lithium perchlorate in a natural rubber matrix). Using this device, it should be possible to detect a force as small as about $5 \times 10^{-5}$N. Using appropriate amplifiers it should be possible to measure a force as small as one micronewton ($10^{-6}$N). The smallest force that the available commercial sensors can measure is about one millinewton ($1 \times 10^{-3}$ N). Thus the sensors discussed in this patent have up to about 3 orders of magnitude higher sensitivity.

For the configuration involving electrodes deposited side-by-side in contact with the polymer electrolyte film (e.g. polyethylene oxide+lithium perchlorate in 1,4 cis-polyisoprene), the internal impedance is larger and the voltage output should be amplified using a charge amplifier and then displayed on the oscilloscope. This sensor configuration is similar to that of silicon piezoresistive sensors used in detecting stress distributions on silicon chips except for the fact that in a piezoresistive sensor a change in resistivity is used as the detected signal. In the device of this invention, a change in voltage or charge is used for such detection. The sensitivity of these novel sensors is significantly higher than that of silicon sensors which are known to have extensive commercial usage.

Depending on the materials, solid, semi-solid, gel, paste or liquid, different sensitivities, advantages and disadvantages in device performance can be expected. The examples of materials discussed above include polymer electrolytes and composites. It has been demonstrated proof-of-the-principle devices using liquid electrolytes (e.g. lithium perchlorate in water solution) as well.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. It should further be noted that any patents, applications or publications referred to herein are incorporated by reference in their entirety.

References

1. *Sensor Technology and Devices*, ed. Ljubisa Ristic, Artech House, Norwood, Me., 1994.

2. *Semiconductor Sensors*, ed. S. M. Sze, John Wiley & Sons, New York, 1994.

3. *AIP Handbook of Modern Sensors*, Jacob Fraden, American Institute of Physics, New York, 1993.

4. *Polymer Electrolytes*, F. M. Gray, The Royal Society of Chemistry, Cambridge, UK, 1997.

Advantages and Features of the Invention

1) A novel technology for sensing mechanical quantities such as force, stress, strain, pressure and acceleration has been invented.

2) This technology is based on the novel idea that the electromotive force (voltage output) of an electrochemical cell (battery) changes as the relative position or configuration of the electrodes change. The electrodes are in contact with an electrolyte as in a typical electrochemical cell.

3) The electrodes (anode and cathode) consist of metals or other conductors of dissimilar electronegativities.

4) The electrolytes can be any ion conductor based on organic or inorganic materials such as polymers, polymer composites, ion conducting glasses and ceramics, gels, pastes or liquids.

5) Various device configurations can be constructed involving the basic elements: an electrolyte, an anode and a cathode.

6) The two electrodes can be parallel and opposing with the electrolyte between them and in contact. The voltage output increases as the sensing area is increased.

7) The electrodes can be deposited side-by-side and connected to the electrolyte film. If the electrolyte is a solid such as a polymer or polymer composite electrolyte, the restoring force is provided by the elasticity of the material. For semisolid, gel, and paste electrolytes, a configuration (e.g. a spring) that provides a restoring force is needed for device operation.

8) The force, pressure, stress, strain or acceleration signal applied on one of the electrodes changes the relative position or configuration between the electrodes, leading to a change in the internal resistance of the cell and thus a change in the voltage output is obtained. The voltage (sensor signal) is measured in an oscilloscope or a voltmeter.

9) For the side-by-side configuration, a charge amplifier is used to record the voltage or sensor signal.

10) The sensitivity measured for the parallel electrode configuration is up to about three orders of magnitude higher than a comparable commercial sensor for measurements of mechanical quantities.

11) The sensitivity of the sensor constructed in the side-by-side construction is significantly higher than that of a commercial silicon piezoresistive sensor. The side-by-side configuration is relevant to stress sensor applications in silicon chips.

What is claimed is:

1. An apparatus for sensing mechanical quantities such as force, stress, strain, pressure, and acceleration, comprising:
    an electrochemical cell comprising an anode and a cathode constructed of metals or other conductors of dissimilar electronegativities; and
    an electrolyte that is a doped 1,4 cis-polyisoprene,
    such that said two electrodes can be parallel and opposing with said electrolyte between them and in contact with a diaphragm in contact with one of the electrodes, whereby force, pressure, stress, strain or acceleration signal applied on the diaphragm changes the relative position or configuration between the electrodes, leading to a change in the internal resistance of the cell and causing a change in the voltage output.

2. The apparatus of claim 1 in which the 1,4 cis-polyisoprene is doped with lithium perchlorate.

3. The apparatus of claim 1 in which the 1,4 cis-polyisoprene is doped with iodine.

4. A method for sensing mechanical quantities such as force, stress, strain, pressure and acceleration comprising:
    utilizing an electrochemical cell comprising an anode and cathode constructed of metals or other conductors of dissimilar electronegativities; and
    which has an electrolyte selected from the group consisting of polymers, polymer composites, ion conducting glasses and ceramics, gels, pastes and liquids,
    wherein the two electrodes are parallel and opposing with said electrolyte between them and in contact with a diaphragm in contact with one of the electrodes, whereby force, pressure, stress, strain or acceleration signal applied on the diaphragm changes the relative position or configuration between the electrodes, leading to a change in the internal resistance of the cell and causing a change in the voltage output.

5. The method of claim 4 in which the electrolyte is polyethylene oxide doped with lithium perchlorate.

6. The method of claim 4 in which the electrolyte is nafion.

7. The method of claim 4 in which the electrolyte is a doped polyaniline.

8. The method of claim 4 in which the electrolyte is 1,4 cis-polyisopropene in the crosslinked form doped with lithium perchloride.

9. The method of claim 4 in which the electrolyte is 1,4 cis-polyisopropene doped with iodine.

10. A method for sensing mechanical quantities such as force, stress, strain, pressure, and acceleration comprising:
    using an electrochemical cell having an anode and a cathode constructed of metals or other conductors of dissimilar electronegativities; and
    containing an electrolyte selected from the group consisting of polymers, polymer composites, ion conducting glasses and ceramics, gels, pastes and liquids, with the electrolyte being between said two electrodes whereby force, pressure, stress, strain or an acceleration signal is applied on one of the electrodes which changes the relative position or configuration between the electrodes, leading to a change in the internal resistance of the cell and causing a change in the voltage output.

11. An apparatus for sensing mechanical quantities such as force, stress, strain, pressure, and acceleration, comprising:
    an electrochemical cell comprising an anode and a cathode constructed of metals or other conductors of dissimilar electronegativities;
    an electrolyte selected form the group consisting of polymers, polymer composites, ion conducting glasses and ceramics, gels, pastes and liquids,
    such that said two electrodes can be parallel and opposing with said electrolyte between them and in contact with a diaphragm in contact with one of the electrodes, whereby force, pressure, stress, strain or acceleration signal applied on the diaphragm changes the relative position or configuration between the electrodes, leading to a change in the internal resistance of the cell and causing a change in the voltage output; and
    an amplifier for increasing the voltage to a level capable of producing an acoustic or light signal that can be detected by a human being.

12. An apparatus for sensing mechanical quantities such as force, stress, strain, pressure, and acceleration, comprising:
    an electrochemical cell comprising an anode and a cathode constructed of metals or other conductors of dissimilar electronegativities; and
    an electrolyte selected form the group consisting of polymers, polymer composites, ion conducting glasses and ceramics, gels, pastes and liquids,
    such that said two electrodes can be parallel and opposing with said electrolyte between them and in contact with a diaphragm in contact with one of the electrodes, whereby force, pressure, stress, strain or acceleration signal applied on the diaphragm changes the relative position or configuration between the electrodes, leading to a change in the internal resistance of the cell and causing a change in the voltage output, with the voltage increasing as the sensing area of the apparatus increases.

13. The apparatus of claim 12 wherein the sensing area of the apparatus is greater than 10 $cm^2$.

* * * * *